United States Patent [19]

Harada et al.

[11] Patent Number: 5,234,668
[45] Date of Patent: * Aug. 10, 1993

[54] CATALYTIC CONVERTER FOR USE IN AUTOMOTIVE EXHAUST EMISSIONS CONTROL

[75] Inventors: Takashi Harada, Nagoya; Fumio Abe, Handa; Hiroshige Mizuno, Tajimi, all of Japan

[73] Assignee: NGK Insulators, Ltd., Japan

[*] Notice: The portion of the term of this patent subsequent to Nov. 5, 2008 has been disclaimed.

[21] Appl. No.: 853,005

[22] Filed: Mar. 17, 1992

Related U.S. Application Data

[63] Continuation of Ser. No. 581,986, Sep. 14, 1990, abandoned.

[30] Foreign Application Priority Data

Jul. 25, 1990 [JP] Japan ................... 2-196511

[51] Int. Cl.$^5$ ................... F01N 3/10; B01D 53/36; H05B 3/10
[52] U.S. Cl. ................... 422/174; 422/177; 422/179; 422/180; 55/523; 55/DIG. 30; 60/300
[58] Field of Search ............... 422/174, 177, 179, 180; 55/523, DIG. 30; 60/300

[56] References Cited

U.S. PATENT DOCUMENTS

| | | | |
|---|---|---|---|
| 3,755,204 | 8/1973 | Sergeys | 502/241 |
| 3,768,982 | 10/1973 | Kitzner et al. | 60/300 X |
| 3,770,389 | 10/1973 | Kitzner et al. | 422/174 |
| 3,925,252 | 12/1975 | Yabuta et al. | 422/173 |
| 3,956,614 | 5/1976 | Hervert | 219/541 |
| 4,023,360 | 5/1977 | Wössner et al. | 60/277 |
| 4,322,387 | 3/1982 | Virk et al. | 422/174 |
| 4,345,430 | 8/1982 | Pallo et al. | 60/282 |
| 4,420,316 | 12/1983 | Frost et al. | 422/180 X |
| 4,505,107 | 3/1985 | Yamaguchi et al. | 60/303 |
| 4,758,272 | 7/1988 | Pierotti et al. | 75/246 |
| 5,011,529 | 4/1991 | Hogue et al. | 75/235 |

FOREIGN PATENT DOCUMENTS

| | | |
|---|---|---|
| 0194507 | 2/1986 | European Pat. Off. |
| 0355489 | 2/1990 | European Pat. Off. |
| 1188373 | 3/1965 | Fed. Rep. of Germany |
| 2333092 | 1/1975 | Fed. Rep. of Germany ........ 60/300 |
| 61-161599 | 10/1986 | Japan |
| 63-67609 | 5/1988 | Japan |
| 1492929 | 7/1974 | United Kingdom |
| 2049377A | 12/1980 | United Kingdom |
| WO89/10471 | 11/1989 | World Int. Prop. O. |

OTHER PUBLICATIONS

SwRI-9574 "Experimentation to Determine the Feasibility of Air Injection on an Electrically-Heated Catalyst for Reducing Cold-Start Benzene Emissions from Gasoline Vehicles" By Martin J. Heimrich, Jan., 1990.

Primary Examiner—Robert J. Warden
Assistant Examiner—Stephanie Blythe
Attorney, Agent, or Firm—Parkhurst, Wendel & Rossi

[57] ABSTRACT

A catalytic converter suitable for use in controlling automotive exhaust emissions including honeycomb heaters which are respectively disposed upstream and downstream of a main monolithic catalyst. Each honeycomb heater includes a honeycomb structure with at least two electrodes provided thereon to supply a current to the honeycomb structure.

6 Claims, 2 Drawing Sheets

CATALYTIC CONVERTER FOR USE IN AUTOMOTIVE EXHAUST EMISSIONS CONTROL

This is a continuation of application Ser. No. 07/581,986 filed Sep. 14, 1990, now abandoned.

BACKGROUND OF THE INVENTION

1. Field of the Invention

The present invention relates to a catalytic converter suitable for use in automotive exhaust emissions control.

2. Description of the Related Art:

Catalytic converters for use in automotive exhaust gas control must have a predetermined temperature or above when operated so that its catalyst is active. Hence, the catalyst must be heated when the temperature thereof is not yet sufficiently high, e.g., at the beginning of running of a vehicle.

Such techniques for heating the catalyst have been proposed in, for example, Japanese Utility Model Laid-Open No. 67609/1988. This disclosed technique is a catalytic converter comprised of a metal monolithic catalyst which is disposed upstream of and adjacent to a main ceramic monolithic catalyst. The metal monolithic catalyst comprises an electrically conductible metal substrate with alumina coated thereon.

However, deterioration of the catalyst such as a monolithic catalyst starts with that located upstream. In the catalytic converter disclosed in Japanese Utility Model Laid-Open No. 67609/1988, the catalytic component in the metal monolithic catalyst, which is a preheater disposed upstream of and adjacent to the main monolithic catalyst, therefore deteriorates first, thereby reducing its exhaust gas conversion efficiency when the temperature of the exhaust gas is low. Furthermore, there is a possibility of the metal substrate being corroded.

SUMMARY OF THE INVENTION

An object of the present invention is to provide a catalytic converter which is capable of eliminating the aforementioned problem of the conventional techniques by disposing heaters both upstream and downstream of a main monolithic catalyst.

To this end, the present invention provides a catalytic converter suitable for use in controlling automotive exhaust emissions. The catalytic converter includes honeycomb heaters respectively disposed upstream and downstream of a main monolithic catalyst. Each honeycomb heater comprises a honeycomb structure with at least two electrodes provided thereon to supply a current to the honeycomb structure.

Among the honeycomb heaters respectively disposed upstream and downstream of the main monolithic catalyst, at least the honeycomb heater disposed downstream of the main monolithic catalyst preferably comprises a honeycomb structure with a catalyst carried thereon.

A honeycomb heater having a resistance adjusting mechanism, such as a slit or slits, between the electrodes exhibits excellent heat generating characteristics, and is therefore preferable. Preferably, the honeycomb structure employed in the present invention is prepared by extruding metal powders into a honeycomb configuration and then by sintering the formed honeycomb body.

Two or more honeycomb heaters may be provided respectively upstream and downstream of the main monolithic catalyst.

DETAILED DESCRIPTION OF THE INVENTION

Figure 1:
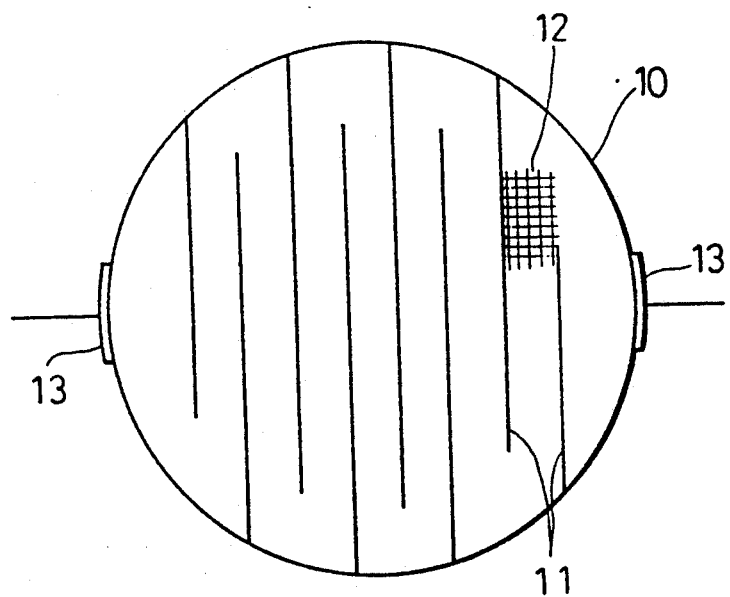
FIG. 1 is a plan view of an example of a honeycomb heater with a catalyst carried thereon.

In the catalytic converter of the present invention, honeycomb heaters are respectively disposed upstream and downstream of a main monolithic catalyst. Each honeycomb heater comprises a honeycomb structure with at least two electrodes provided thereon to supply a current to the honeycomb structure.

In the case where the honeycomb heater is disposed only upstream of the main monolithic catalyst, the catalyst carried on the honeycomb heater deteriorates during the use, thereby reducing the conversion performance when the temperature of an exhaust gas is low.

In the case where the honeycomb heater is disposed only downstream of the main monolithic catalyst, since the main monolithic catalyst disposed upstream of the honeycomb heater has a large heat capacity, the temperature of the exhaust gas does not rise rapidly when the temperature of the exhaust gas is low, delaying the action of the catalyst and increasing power consumption.

Hence, in the present invention, the honeycomb heaters are respectively disposed upstream and downstream of the main monolithic catalyst. In this way, a low-temperature exhaust gas at the beginning of operation of an engine can be heated without the aforementioned problems being aroused. Furthermore, since at least two honeycomb heaters are provided, heating temperature can be adjusted.

Whereas any material, ceramic or metal, capable of generating heat when energized, can be used as the material of the honeycomb structure which is a basic body of the present invention, the use of metal enhances the mechanical strength and is thus preferred. Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can be closely adhered to such a honeycomb structure, and hardly peels off the honeycomb structure even when a difference in the thermal expansion between the honeycomb structure and the catalyst exists.

The metal honeycomb structure will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 1450° C. During the sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Sintering at a temperature lower than 1000° C. achieves no sintering. Sintering conducted at a temperature higher than 1450° C. causes deformation of the resulting sintered body and is thus undesirable.

Preferably, a heat-resistant metal oxide layer is then formed on the surface of the cell walls and the surface of the pores of the obtained honeycomb structure.

Next, a resistance adjusting mechanism of a desired form is preferably provided on the obtained honeycomb structure between the electrodes thereof, which will be described later.

The resistance adjusting mechanism provided on the honeycomb structure may take on any of the following forms:

(1) a slit or slits of any length, formed in any direction at any position;
(2) variations in the length of the cell walls in the axial direction of the passages;
(3) variations in the thickness (wall thickness) of the cell walls of the honeycomb structure or variations in the cell density of the honeycomb structure, or;
(4) a slit or slits formed in the cell wall (rib) of the honeycomb structure.

Electrodes are provided generally on the outer peripheral portion of or inside of the thus-obtained metal honeycomb structure by welding or brazing to manufacture a honeycomb heater.

The term "electrodes" is used in this application to refer to any terminal through which a voltage is applied to the heater. The electrodes include the direct bonding of the outer peripheral portion of the heater to a can body and terminals for grounding.

In the case of the metal honeycomb structure which is used as a heater, the resistance thereof will be preferably held between 0.001 Ω and 0.5 Ω.

Preferably, a catalyst is placed on the surface of the metal honeycomb structure so as to allow heat to be generated due to reaction (oxidation) of the exhaust gas.

The catalyst supported on the surface of the metal honeycomb structure is made of a carrier having a high surface area and a catalyst activating material supported on the carrier. Typical examples of carriers having a high surface area include $\gamma$-$Al_2O_3$, $TiO_2$, $SiO_2$-$Al_2O_3$ and perovskite. Examples of the catalytic activating material include noble metals, such as Pt, Pd and Rh, and base metals, such as Cu, Ni, Cr and Co. The preferred catalyst comprises one in which from 10 to 100 g/$ft^3$ of Pt and/or Pd is loaded on the carrier made of $\gamma$-$Al_2O_3$.

Whereas the honeycomb structure employed in the present invention may have any honeycomb configuration, it is desirable that the cell density ranges from 6 to 1500 $cpi^2$ (0.9 to 233 cells/$cm^2$) with a wall thickness ranging from 50 to 2000 μm.

As stated above, the honeycomb structure employed in the present invention may be porous or non-porous. To achieve sufficient mechanical strength and resistance to oxidation and corrosion, however, the porosity of the metal honeycomb structure will preferably be held between 0 and 50% by volume with most preferable porosity being less than 25% by volume. In a metal honeycomb structure designed for use as a catalyst substrate, the porosity will be held to 5% or above to ensure strong adhesion between the honeycomb structure and a catalyst layer.

The term, "honeycomb structure" is employed in this application to refer to an integral body having a large number of passages partitioned by the walls. The passages may have any cross-sectional form (cell shape), e.g., a circular polygonal or corrugated form.

The present invention will further be illustrated in the following examples which are intended to be illustrative, but not limiting, of this invention.

FIG. 1 is a plan view of an example of a honeycomb heater with a catalyst carried thereon according to the present invention. A plurality of slits 11, which act as the resistance adjusting mechanisms, are provided in a honeycomb structure 10 having a large number of passages 12. Two electrodes 13 are provided on the outer wall of the honeycomb structure 10.

Figure 2:
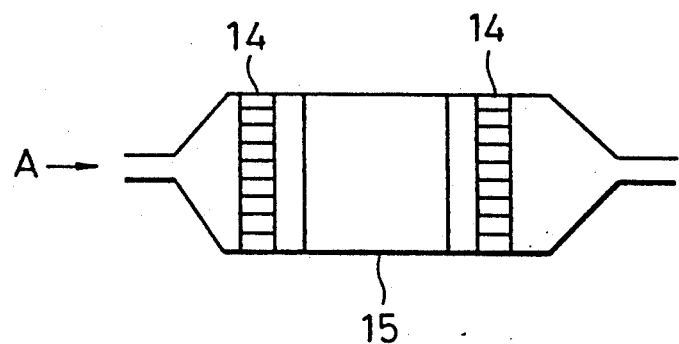
FIGS. 2 to 4 show examples of catalytic converters according to the present invention which are suitable for use in controlling automotive exhaust gas emissions.
Figure 3:
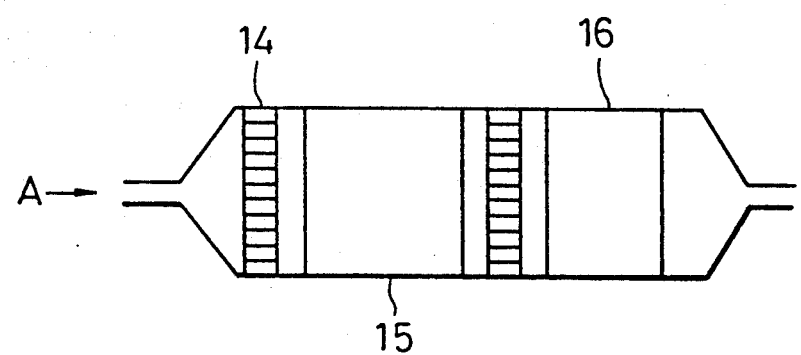
Figure 4:
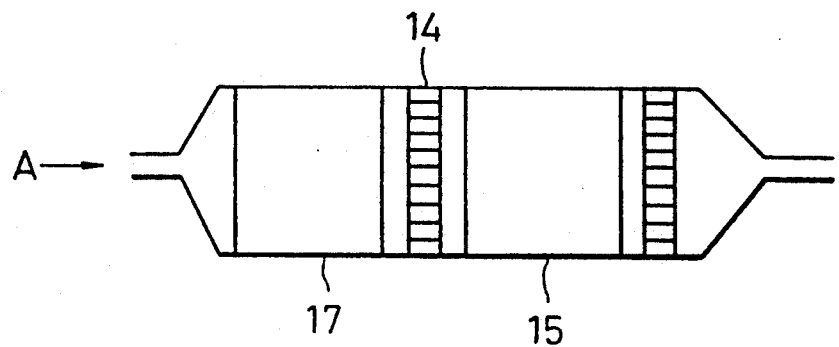

FIGS. 2 to 4 show examples of a catalytic converter for use in controlling automotive exhaust emissions according to the present invention.

FIG. 2 shows an example of a catalytic converter in which honeycomb heaters or heater catalysts (catalyzed honeycomb heater) 14 are respectively disposed in front of (upstream of) and at the rear of (downstream of) a main monolithic catalyst 15.

FIG. 3 shows an example of a catalytic converter in which honeycomb heaters or heater catalysts 14 are respectively disposed upstream and downstream of a main monolithic catalyst 15 and in which a main monolithic catalyst or a light-off catalyst (catalyst for ignition) 16 is disposed downstream of the honeycomb heater or the heater catalyst disposed downstream of the main monolithic catalyst 15.

FIG. 4 shows an example of a catalytic converter in which honeycomb heaters or heater catalysts 14 are respectively disposed upstream and downstream of a main monolithic catalyst 15 and in which a main monolithic catalyst or a light-off catalyst 17 is disposed upstream of the honeycomb heater or the heater catalyst disposed upstream of the main monolithic catalyst 15.

EXAMPLE

Fe powder, Fe-Cr powder and Fe-Al powder were mixed to prepare a mixture having a composition of Fe-20Cr-5Al (% by weight). The obtained mixture was then formed by the extrusion into a honeycomb body. The formed honeycomb body was sintered at an atmosphere of $H_2$ to obtain a honeycomb structure having an outer diameter of 93 mm$\phi$, a length of 15 mm, a cell wall (rib) thickness of 8 mil and a passage density of 300 cells/$in^2$. Thereafter, eight slits 11, six of which had a length of about 70 mm while two of them located at the two sides had a length of about 50 mm, were formed in the obtained honeycomb structure 10 in the axial direction of passages 12 thereof in so as to be separated from each other by a distance corresponding to four cells (about 8 mm), i.e., four cells were disposed between the adjacent slits 11, as shown in FIG. 1.

A layer of $\gamma$-alumina was coated on the honeycomb structure 10. Thereafter, 20 g/$ft^3$ of Pd and Pt were respectively loaded on the coated layer. The whole structure was then sintered at 600° C. to generate a catalyst. Subsequently, two electrodes 13 were provided on the outer wall of the obtained honeycomb structure 10, as shown in FIG. 1, to make it a heater catalyst 14.

The obtained heater catalysts 14 were respectively disposed in front of (upstream of) and at the rear of (downstream of) a three-way catalyst 15 available on the market which was a main monolithic catalyst, as shown in FIG. 2.

The performance of this system at the beginning of the operation of an engine was tested by introducing into this system an exhaust gas A whose temperature was raised at a same rate from 100° C. to 420° C. for two minutes and was then maintained at 420° C. for one minute (warming-up test) and by measuring the conversion for CO, HC and NOx. At the beginning of the test, the heater catalysts 14 disposed in front of and at the rear of the main monolithic catalyst 15 were energized for one minute by a battery of 12 V in order to heat the exhaust gas to 350° C.

For comparison, a warming-up test was conducted under the same conditions as those of the above case on a catalytic converter system in which the heater catalyst was disposed only at the rear of the main monolith catalyst 15.

Table 1 shows the results of these measurements.

Next, the durability test was conducted in the manner described below: the temperature of an exhaust gas was raised from room temperature to 750° C., and then maintained at 750° C. for ten hours. While the temperature was maintained at 750° C., a cyclic operation was repeated in which the engine was cruised for 60 seconds and then introduction of the fuel was cut for 5 seconds. At the beginning of the durability test, energization of the heater catalysts 14 was started one minute before the engine was started and continued until the temperature of the exhaust gas reached 350° C.

After this durability test was performed ten times, the above-described warming-up test was conducted and the conversion for CO, HC and NOx was measured.

For comparison, the durability test was conducted under the same conditions as those of the above case on a system in which the heater catalyst 14 was disposed in front of the main monolithic catalyst 15.

Table 2 shows the results of the measurements.

TABLE 1

| Average conversion (%) (warming-up test) | | | |
|---|---|---|---|
| | CO | HC | NOx |
| The present invention | 68 | 53 | 64 |
| Comparative example | 63 | 48 | 61 |

TABLE 2

| Average conversion (%) (warming-up test conducted after the durability test) | | | |
|---|---|---|---|
| | CO | HC | NOx |
| The present invention | 62 | 49 | 62 |

TABLE 2-continued

| Average conversion (%) (warming-up test conducted after the durability test) | | | |
|---|---|---|---|
| | CO | HC | NOx |
| Comparative example | 48 | 41 | 46 |

As will be understood from the foregoing description, in the catalytic converter according to the present invention, the honeycomb heaters are respectively disposed upstream and downstream of the main monolithic catalyst. In consequence, an exhaust gas whose temperature is low can be heated by the honeycomb heaters at the beginning of operation of th engine. Furthermore, even when the catalyst carried on the heater disposed upstream of the main monolithic catalyst deteriorates during use, the exhaust gas conversion performance at the beginning of operation of the engine can be assured by the honeycomb heater disposed downstream of the main monolithic catalyst.

What is claimed is:

1. A catalytic converter for a fluid to be flowed therethrough, comprising:
   (i) a main monolithic catalyst capable of being disposed in a fluid stream; and
   (ii) heating elements capable of being disposed in said fluid stream and being upstream and downstream of said main monolithic catalyst, respectively, said heating elements comprising:
   an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   at least two electrodes in electrical contact with said honeycomb structure.

2. The catalytic converter of claim 1, wherein at least said heating element disposed upstream of said main monolithic catalyst further comprises a catalyst material formed on said partition walls.

3. The catalytic converter of claim 1, wherein said at least one slit pierces the radial periphery of said honeycomb structure.

4. The catalytic converter of claim 1, wherein said electrodes are in electrical contact with the radial periphery of said honeycomb structure.

5. The catalytic converter of claim 4, wherein said electrodes are located in opposition to each other across a volume of said honeycomb structure, in a direction which is generally transverse to said axial direction.

6. The catalytic converter of claim 1, wherein said at least one slit is defined by a plurality of slits which are parallel.

* * * * *